(12) United States Patent
Nagy et al.

(10) Patent No.: US 6,921,661 B2
(45) Date of Patent: Jul. 26, 2005

(54) COMPOSTING DEVICE

(75) Inventors: Jayne Nagy, Tottenham (CA); Kathy Rayburn, Tottenham (CA); James Kirby Rayburn, Etobicoke (CA); Richard Paul Morawietz, Richmondhill (CA)

(73) Assignee: Ideas That Grow Inc., Tottenham (CA)

(*) Notice: Subject to any disclaimer, the term of this patent is extended or adjusted under 35 U.S.C. 154(b) by 0 days.

(21) Appl. No.: 10/657,301

(22) Filed: Sep. 8, 2003

(65) Prior Publication Data

US 2005/0054085 A1 Mar. 10, 2005

(51) Int. Cl.[7] .................................................. C12M 1/00
(52) U.S. Cl. ............................. 435/290.1; 435/290.4; 220/908
(58) Field of Search ........................ 435/290.4, 290.1; 220/908

(56) References Cited

U.S. PATENT DOCUMENTS

| | | | | |
|---|---|---|---|---|
| 4,105,412 A | * | 8/1978 | Petzinger | 422/275 |
| 5,118,005 A | * | 6/1992 | Onodera | 220/501 |
| D332,678 S | * | 1/1993 | Barclay et al. | D34/1 |
| D351,697 S | * | 10/1994 | Blotnick | D34/1 |
| 6,218,177 B1 | * | 4/2001 | Nattrass | 435/290.1 |
| 6,518,057 B2 | * | 2/2003 | Morrison | 435/290.1 |
| D476,127 S | * | 6/2003 | Zeyha et al. | D34/7 |

* cited by examiner

Primary Examiner—David Redding
(74) Attorney, Agent, or Firm—Tarolli, Sundheim, Covell & Tummino L.L.P.

(57) ABSTRACT

A composting device for composting organic matter, includes a hollow container having a bottom end, a top end and at least one sidewall extending therebetween. The top end includes a charge opening therein for adding organic matter. The container also includes a discharge opening for proximal the bottom end for removing compost matter. A removable top cover for cooperating with the top end of the hollow container, covers the charge opening. The top cover is removable to expose the charge opening and includes connection means. An ornament including a corresponding complementary connection means, the complementary connection means cooperating with the connection means of the top cover, for mounting the ornament on the top cover.

14 Claims, 11 Drawing Sheets

COMPOSTING DEVICE

FIELD OF THE INVENTION

This invention relates to composters. More particularly, this invention relates to an improved composter with unique architecture facilitating the addition and venting of compost matter.

BACKGROUND OF THE INVENTION

Composting is a well-known process in which organic matter is converted into humus by microorganisms that consume the organic matter. These microorganisms are aerobic, requiring oxygen to live, and thrive in warm environments. When compost matter becomes wet, the density of the compost matter increases and ventilation is reduced. Therefore, weather changes such as temperature drops or rain make it difficult for the microorganisms to live. Thus, composting by leaving heaps of exposed organic matter to decay is inefficient and time-consuming. Composters have been designed to protect the compost matter and prolong the life of the microorganisms, thereby providing more efficient breakdown of the organic matter.

Conventional composters are single-walled containers of, for example, plastic or wood, that are generally cylindrical or cube shaped and include openings in the container walls to allow venting of the compost matter. The top cover of these composters is opened by lifting and removing, or by lifting and rotating the cover about hinges that are attached to the sidewall. These composters are used to protect the microorganisms by providing a shelter from heavy rains while allowing venting of the compost environment. It will be appreciated, however, that the conventional single-walled composters provide only marginal insulating of the compost material from temperature changes and, in particular, cool temperatures. Also, conventional composters are unsightly boxes or cylinders and thus it is generally desirable to hide these conventional composters out of sight. This discourages composting as many people do not want such an unsightly composter in a yard or, alternatively, place the composter in a hidden location that is difficult to access.

Variations to the conventional composter have been proposed for a variety of reasons. For instance, blow molded, double walled composters have been developed for the purpose of providing a better-insulated environment for the microorganisms in the compost matter, thereby prolonging the life of these microorganisms. Blow-molded, double walled composters capture air between the walls, creating an air barrier between the compost matter and the external environment. The air barrier, however, consists of captured air and venting of the compost matter is inhibited. Thus, the efficiency of these composters can still be improved. Furthermore, as in the conventional composters, the blow-molded composters are unsightly and are thus generally undesirable or are located in a hidden location in a yard.

It is therefore desirable to provide an improved composter that is efficient and attractive.

SUMMARY OF THE INVENTION

In one aspect of the present invention, there is provided a composting device for composting organic matter. The device includes a hollow container having an open bottom end, a top end and at least one sidewall extending therebetween. The top end includes a charge opening therein for adding organic matter. The container also includes a discharge opening for proximal the bottom end for removing compost matter. A removable top cover for cooperating with the top end of the hollow container, covers the charge opening. The top cover is removable to expose the charge opening and includes a connection portion. An ornament including a corresponding complementary connection portion, the complementary connection portion cooperating with the connection portion of the top cover, for mounting the ornament on the top cover.

In another aspect, there is provided a composting device for composting organic matter, including a hollow container having an open bottom end, a top end and at least one sidewall extending therebetween. Each of the at least one sidewall includes an inner side panel having openings for ventilation and an outer side panel attached to the inner side panel to provide a double-walled structure. The top end includes a charge opening therein for adding the organic matter. The container further includes a discharge opening proximal the bottom end, for removing compost matter. A removable top cover cooperates with the top end of the hollow container to cover the charge opening. The top cover is removable to expose the charge opening and to aerate the organic matter in the composting device.

In yet another aspect, there is provided a composting device kit for assembly into a composter for composting organic matter. The kit includes a plurality of sidewalls. Each sidewall includes an inner side panel having openings for ventilation, and an outer side panel for attachment to the inner side panel. The sidewalls include attachment means for assembling the sidewalls into a hollow container having an open bottom end and a top end with the sidewalls extending therebetween, such that, when assembled, the top end includes a charge opening for adding the organic matter. At least a portion of one of the sidewalls is removable to expose a discharge opening proximal the bottom end for removing compost matter. A removable top cover is provided for cooperating with the top end of the hollow container to cover the charge opening when assembled. The top cover is movable to expose the charge opening for adding organic matter to the composting device and aerating.

Advantageously, the composting device of the present invention is an attractive composter for display in a persons yard or garden. The top cover of the composting device together with an ornament mounted thereon, pivots about the remainder of the container and thus, the ornament and the top cover of the composting device together pivot about the remainder of the container. Therefore, the ornament does not need to be removed from the top cover when accessing the charge opening to add compost matter to the container. Instead, the top cover pivots, with the ornament still attached, via a pivot rod to thereby expose the charge opening. Feet on the bottom of the composting device, provide stability as the weight of the top and the ornament are pivoted to expose charge opening. These feet are easily buried under, for example, soil to provide further stability. The double-walled composting device of the present invention includes inner side panels and outer side panels, the inner side panels including openings for ventilation. Insulation from the cold is improved while still providing sufficient ventilation.

BRIEF DESCRIPTION OF THE DRAWINGS

The present invention will be better understood with reference to the drawings and to the following description, in which.

DETAILED DESCRIPTION OF THE PREFERRED EMBODIMENTS

Figure 1A:
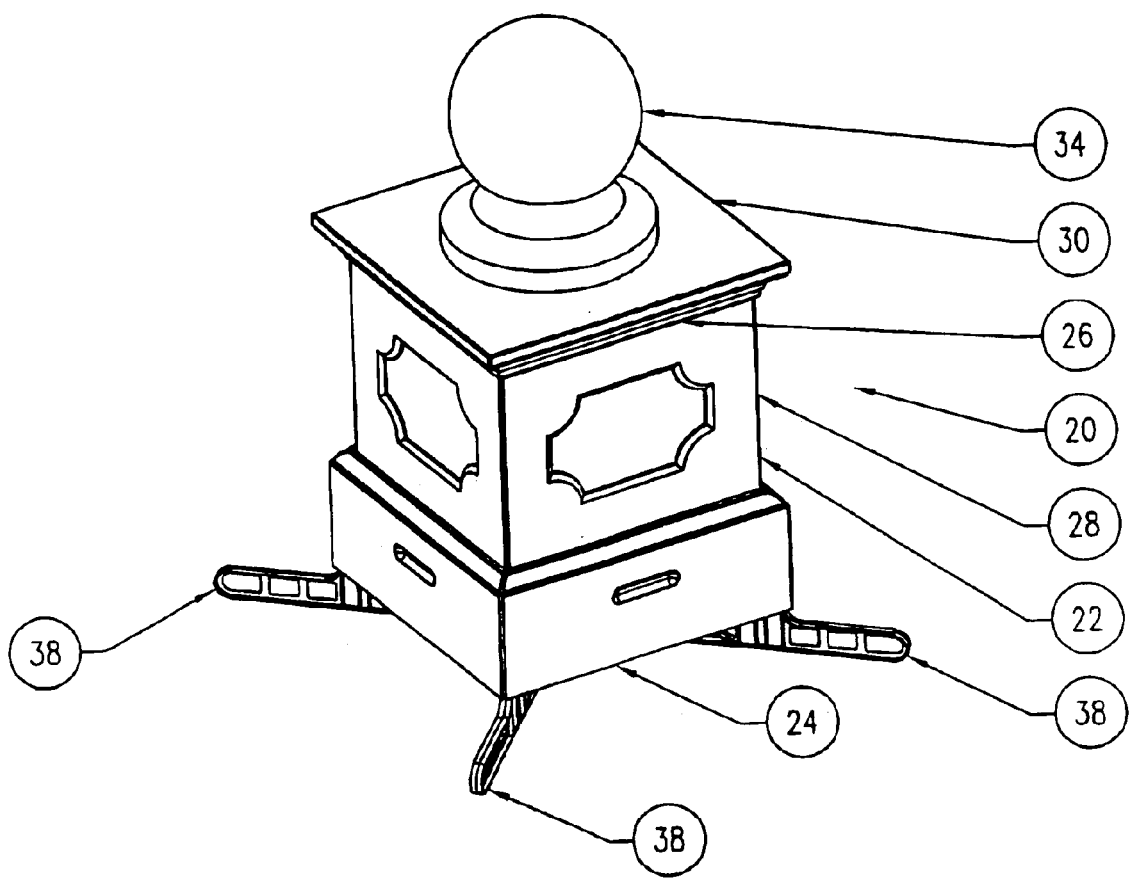
FIG. 1A is a perspective view of a composting device according to one embodiment of the present invention.
Figure 1B:
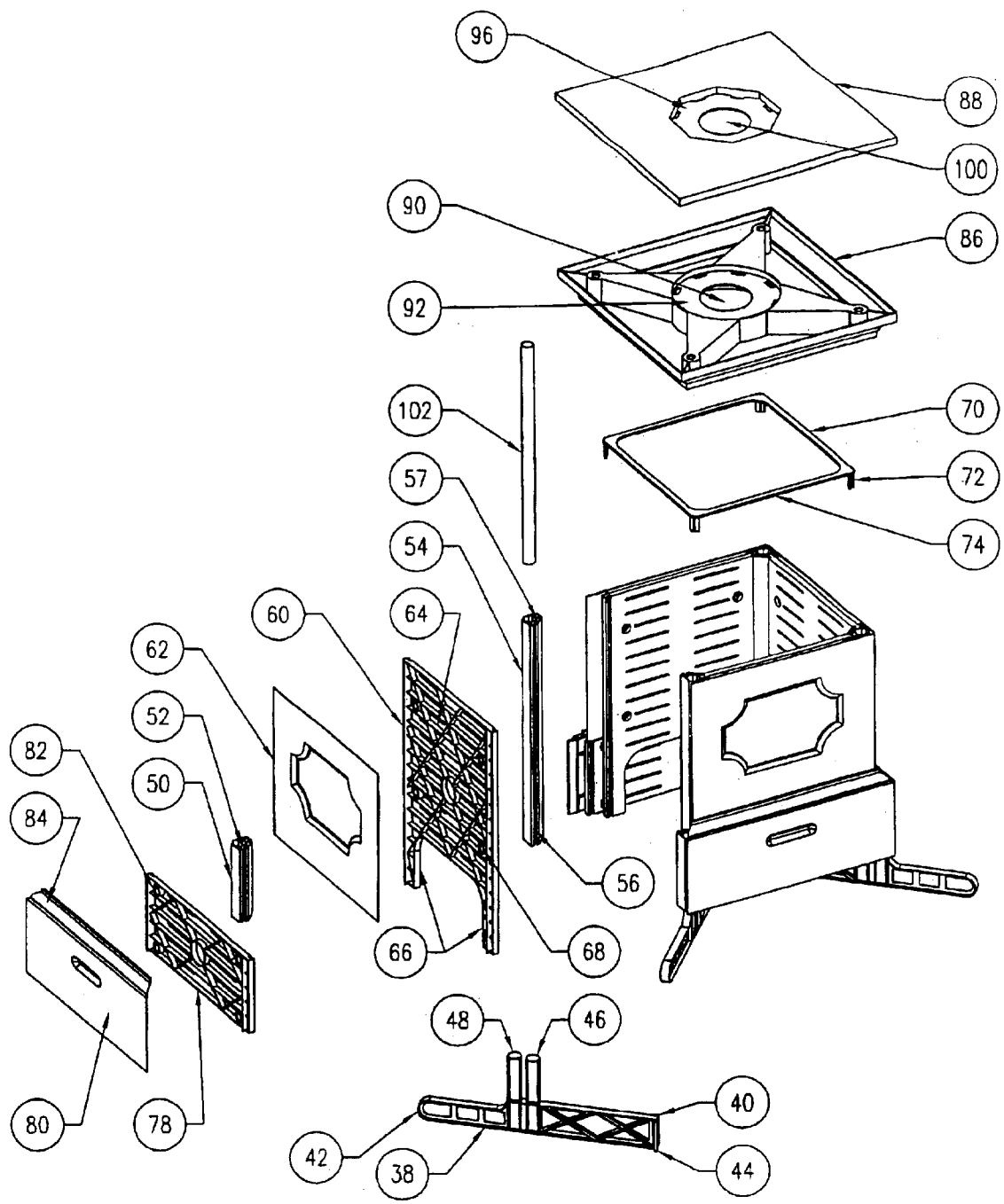
FIG. 1B is an exploded perspective view of the composting device of FIG. 1A.

Reference is first made to FIGS. 1A and 1B to describe an embodiment of the composting device designated generally by the numeral 20. The composting device 20 includes a hollow container 22 having an open bottom end 24, a top end 26 and at least one sidewall 28 extending therebetween. The top end 26 includes a charge opening therein for adding organic matter. The container 22 also includes a discharge opening proximal the bottom end 24 for removing compost matter. A removable top cover 30 for cooperating with the top end 26 of the hollow container 22, covers the charge opening. The top cover 30 is removable to expose the charge opening and includes a connector portion. An ornament 34 includes a corresponding complementary connector portion, the complementary connector portion cooperating with the connector portion of the top cover 30, for mounting the ornament 34 thereon.

Figure 2A:
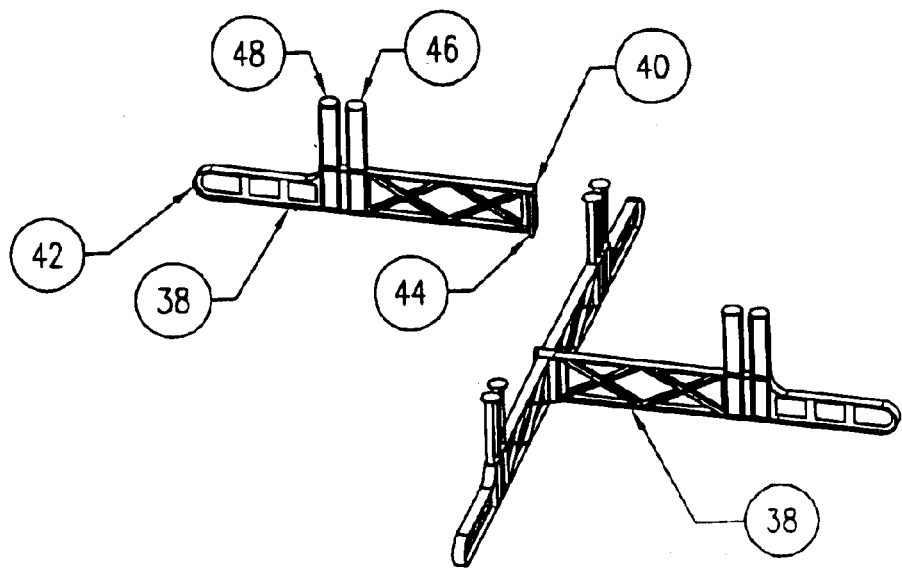
FIGS. 2A and 2B are perspective views of feet of the composting device of FIG. 1A.

The composting device 20 and assembly thereof will now be described in more detail, with reference to FIGS. 2 to 7. Referring first to FIG. 2A, four feet 38 are shown. Each foot 38 extends generally longitudinally from a joining end 40 to an outer end 42. Each joining end 40 includes slide mating portions 44 configured to join together with slide mating portions 44 of two adjacent feet 38. A pair of adjacent spigots Including an inner spigot 46 and an outer spigot 48 project from the feet, between the joining end 40 and the outer end 42. As shown, the spigots 46, 48 project in a transverse direction to the direction of extension of the feet 38 such that, when the composting device 20 is assembled and in use, each of the spigots, 46, 48 extend generally vertically.

Figure 2B:
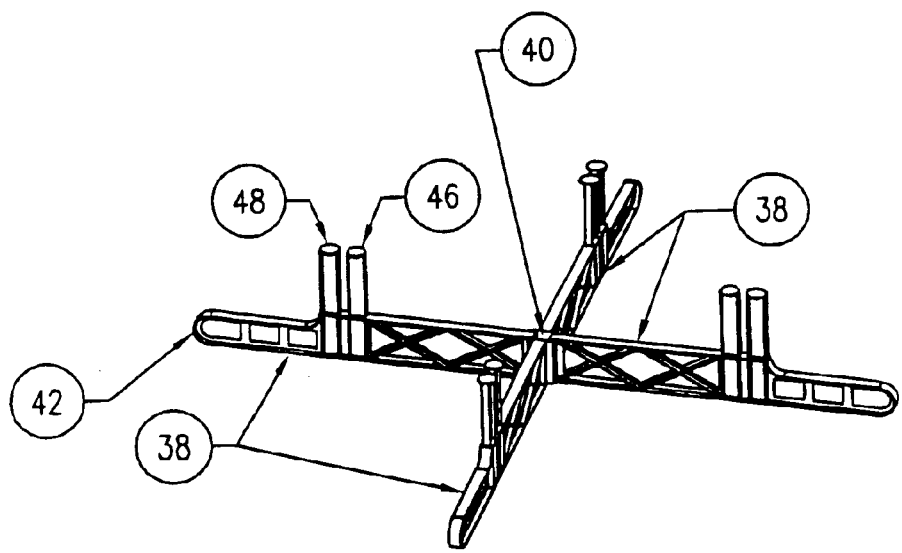

During assembly of the composting device 20, the four feet connect together by joining slide mating portions 44. The slide mating portions 44 slide-fit together such that each foot 38 extends radially outwardly from a center, as shown in FIG. 2B.

Four long corner posts 54 slide over the inner spigots 46, each long corner post 54 sliding over a respective inner spigot 46 and extending therefrom, in the same direction as the inner spigot 46. Clearly, each long corner post 54 is generally triangular in shape and includes a bore extending therethrough, into which the inner spigots 46 slide. Each long corner post 54 also includes slots 56 at two of the three apices of the triangular long corner post 54. Each long corner post 54 is oriented such that the two apices that include the slots 56, face respective opposing long corner posts 54 when assembled. A slide slot 57 is located on the face of the triangular long corner post 54, between the slots 56.

Figure 3:
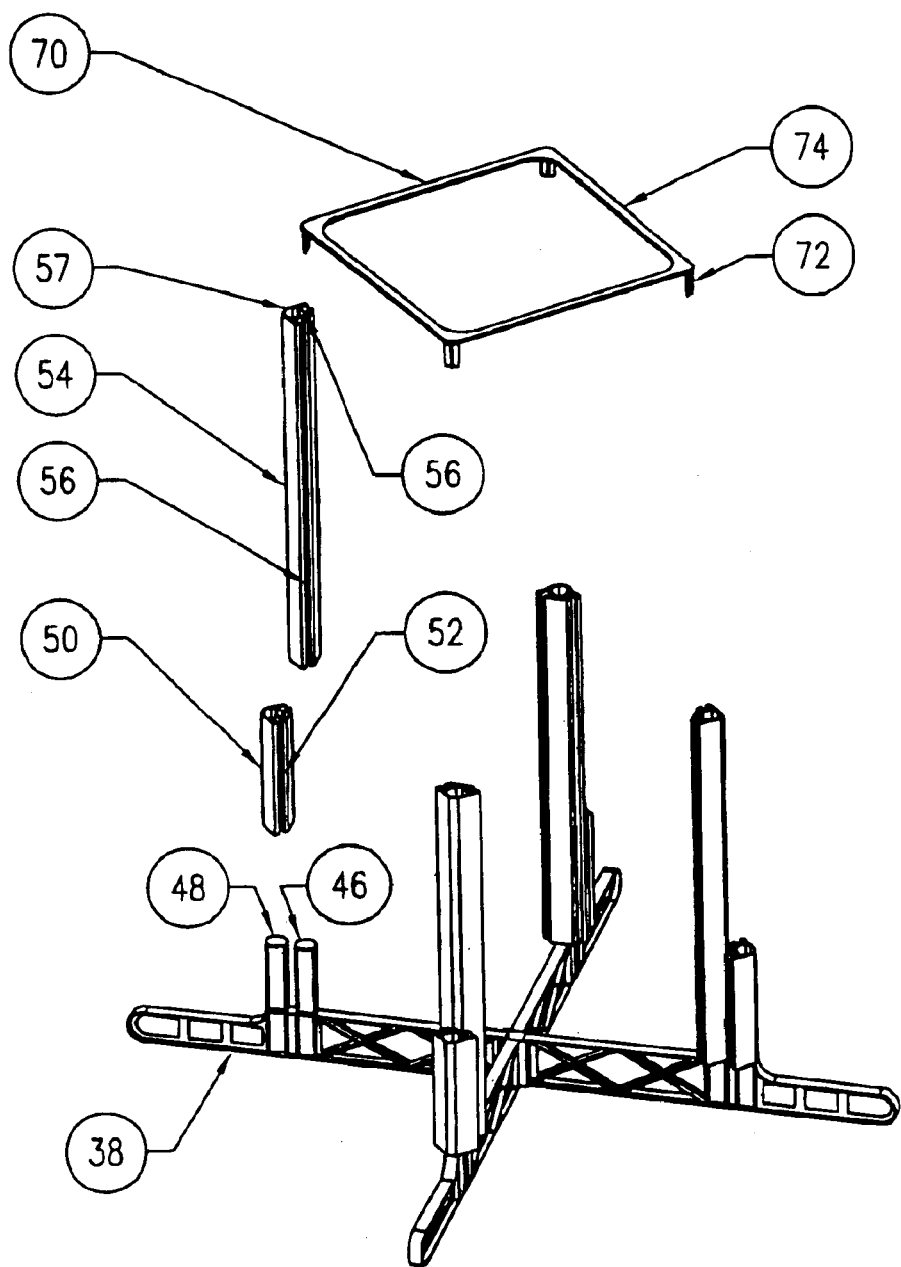
FIG. 3 is a perspective view of portions of the composting device of FIG. 1A.

Referring to FIG. 3, corner posts are added to the spigots 46, 48 after connecting the feet 38 together. Four short corner posts 50 slide over the outer spigots 48, each short corner post 50 sliding over a respective outer spigot 48 and extending therefrom, in the same direction as the outer spigot 48. Similar to the long corner posts 54, each short corner post 50 is generally triangular in shape and includes a bore extending therethrough, into which the outer spigots 48 slide. Each short corner post 50 also includes slots 52 at two of the three apices of the triangular short corner post 50. Each short corner post 50 is oriented such that the two apices that Include the slots 52, face respective opposing short corner posts 50 when assembled.

Figure 4B:
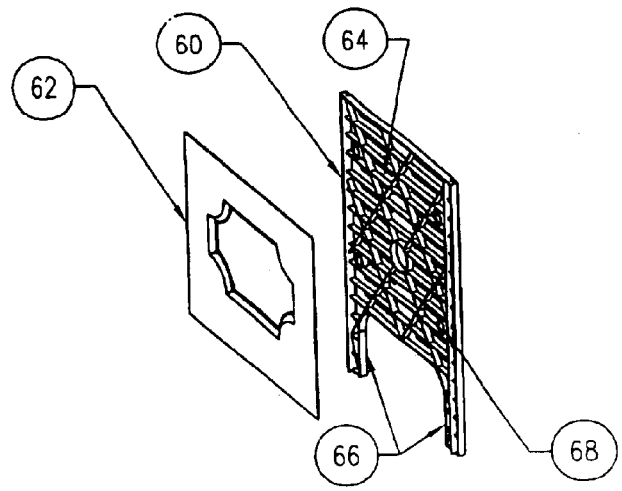
FIGS. 4A and 4B are perspective views of further portions of the composting device of FIG. 1A, showing assembly of a side panel thereof.
Figure 4A:
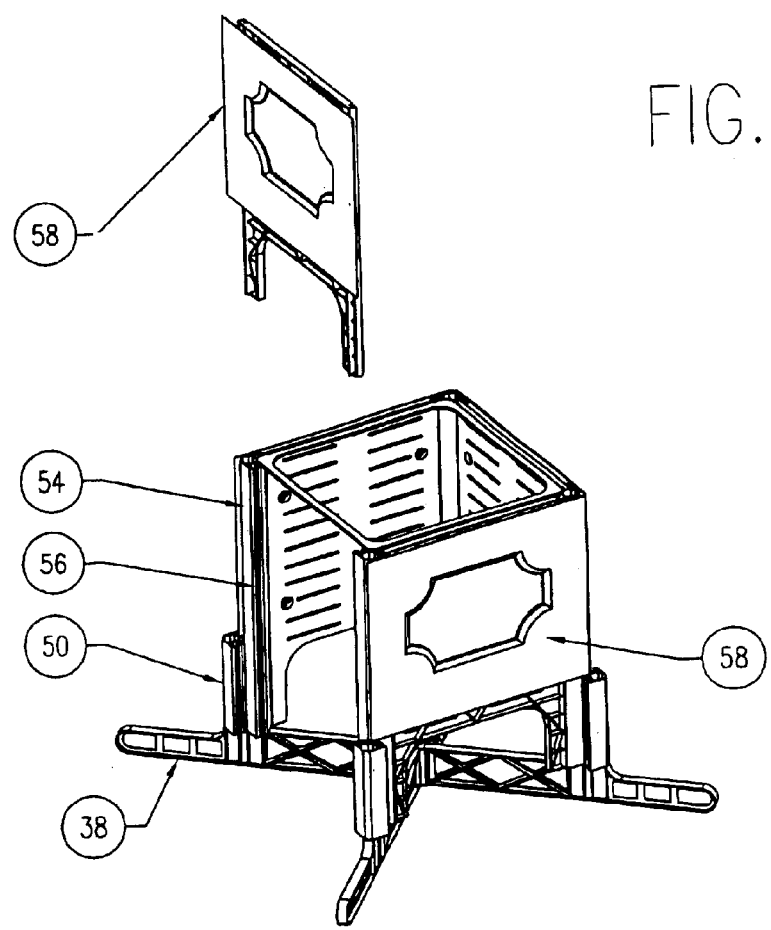

Referring to FIGS. 4A and 4B, side panels 58 are added. Each side panel 58 includes an inner side panel 60 and an outer side panel 62. The inner side panel 60 has a generally rectangular body portion 64 and a pair of legs 66, each leg 66 extending from a respective end of a side of the rectangular body portion 64. It will be understood that length of the body portion 64 including the legs 66 (measured vertically in the Figures) is approximately equal to the length of the long corner posts 54. Each inner side panel 60 is grill-like, including many apertures for ventilation inside the composting device 20. Four generally cylindrical apertures 68 are also provided in the inner side panel 60 for joining the inner and outer side panels, 60, 62, respectively. As shown, the cylindrical apertures 68 are spaced apart on the inner side panel 60.

The outer side panel 62 is generally rectangular in shape and includes four mushroom-type snap fit connectors (not shown) that are sized and spaced to snap into the cylindrical apertures 68, thereby connecting the inner side panel 60 and the outer side panel 62. The dimensions of the outer side panel 62 are such that the outer side panel covers the rectangular body portion 64 of the inner side panel and extends laterally beyond the side edges of the rectangular body portion 64. As will be explained further, each outer side panel 62 extends laterally beyond the rectangular body portion 64 to cover upper portions of the long corner posts 54 when the composting device 20 is assembled. The outer side panel 62 does not extend to cover the legs 66 of the inner side panel 60, however.

After the inner side panel 60 and the outer side panel 62 are connected together, each resulting side panel 58 is connected to a pair of respective long corner posts 54. The side panels 58 are connected to the long corner posts 54 by sliding the side edges of the inner side panels 60 vertically into the slots 56. Clearly, the side edges of the inner side panels 60 are sized and shaped to mate with the slots 56. As stated herein above, when the side panel 58 is connected to the long corner posts 54, each outer side panel 62 extends to cover respective upper portions of the corner posts 54.

A top brace 70 (best shown in FIG. 3) that is generally square in shape, includes four corner spigots 72 that extend transverse to the sides 74 of the square. The top brace 70 and the corner spigots 72 are sized and shaped to mate with the four long corner posts 54 by sliding each corner spigot 72 into the slide slot 57 of a respective one of the four long corner posts 54, without covering the bore of the corner posts 54. Thus, each long corner post 54 has one inner spigot 46 extending into the bore at one end thereof, and one corner spigot 72 slidingly engaged in the slide slot 57 at an opposing end of the long corner post 54. When assembled, the top brace 70 provides support to the upper end of the long corner posts 54.

Figure 5B:
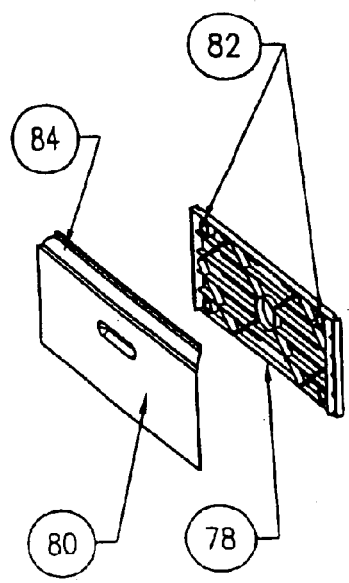
FIGS. 5A and 5B are a perspective views of further portions of the composting device of FIG. 1A, showing assembly of an access panel thereof.
Figure 5A:
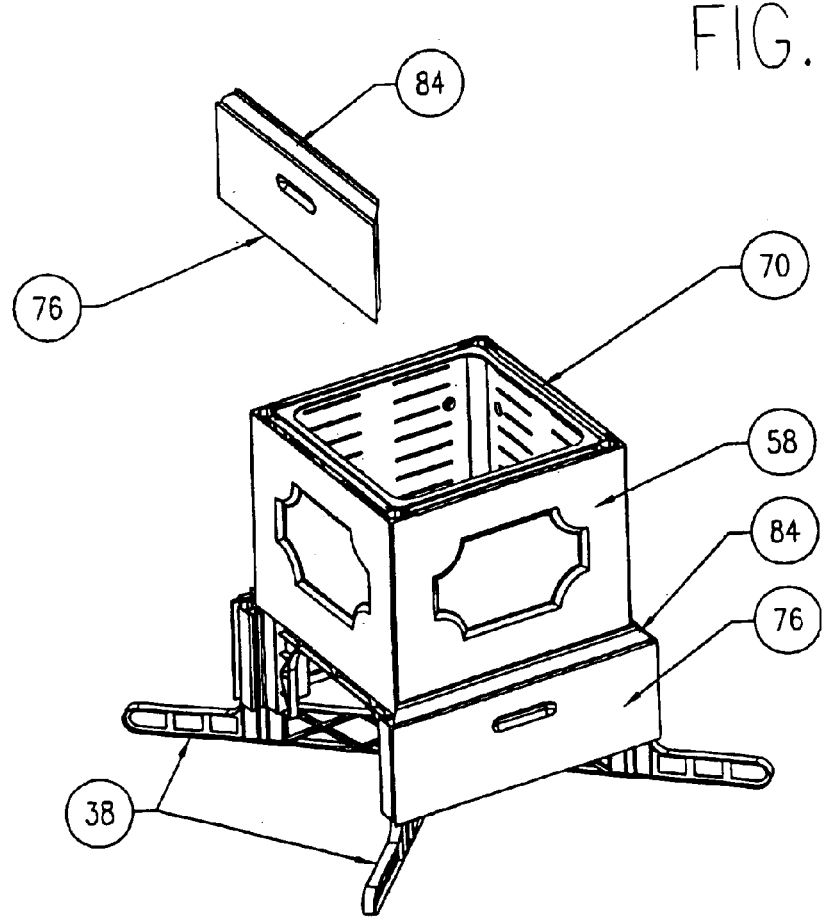

Referring now to FIGS. 5A and 5B, access panels 76 are added. Each access panel 76 includes an inner access panel 78 and an outer access panel 80. The inner access panel 78 is generally rectangular and is sized and shaped to slide into the slots 52 and extend between the short corner posts 50. It will be understood that the length of the inner access panel 78 (measured vertically in the Figures) is approximately equal to the length of the short corner posts 50. Each inner access panel 78 is grill-like, including many apertures for ventilation inside the composting device 20. Four generally cylindrical apertures 82 are also provided in the inner access panel 78 for joining the inner and outer access panels, 78, 80, respectively. As shown, the cylindrical apertures 82 are spaced apart on the inner access panel 78.

The outer access panel 80 Is generally rectangular in shape and includes four mushroom-type snap fit connectors (not shown) that are sized and spaced to snap into the cylindrical apertures 82 of the inner access panel 78, thereby connecting the inner access panel 78 and the outer access panel 80. The dimensions of the outer access panel 80 are such that the outer access panel 80 covers and extends laterally beyond the side edges of the inner access panel 78 to cover the short corner posts 50 when the composting device 20 is assembled. Each outer access panel also includes a protruding lip 84 along a long edge thereof. The lip 84 protrudes at an angle from the outer access panel 80 to extend inwardly toward the outer side panel 62, when the composting device 20 is assembled. A small gap is left between the lip 84 and the outer side panel 62 when the composting device 20 is assembled to provide for ventilation.

After the inner access panel 78 and the outer access panel 80 are connected together, each resulting access panel 76 is connected to a pair of respective short corner posts 50. The access panels 76 are connected to the short corner posts 50 by sliding the side edges of the inner access panels 78 vertically into the slots 52. Clearly, the side edges of the inner access panels 78 are sized and shaped to mate with the slots 52. As stated herein above, when the access panel 76 is connected to the respective short corner posts 50, each outer access panel 80 extends to cover the respective short corner posts 50. Also, the protruding lip 84 of each outer access panel 80 extends inwardly toward the center of the composting device 20 near the respective outer side panel 62, thereby providing a tiered sidewall including the side panel 58 and the access panel 76.

Each access panel 76 is removable from the remainder of the composting device 20, by sliding each panel 76 out of the respective slots 52 of the pair of respective short corner posts 50. Since the access panel 76 covers a portion of the side of the composting device, removal of any of the access panels 76 exposes an opening near the bottom end 24 of the container. Clearly, the opening is provided by the space between the legs 66 of the respective inner side panel 62. This opening, referred to herein as the discharge opening, is useful for removing composted matter.

Figure 6A:
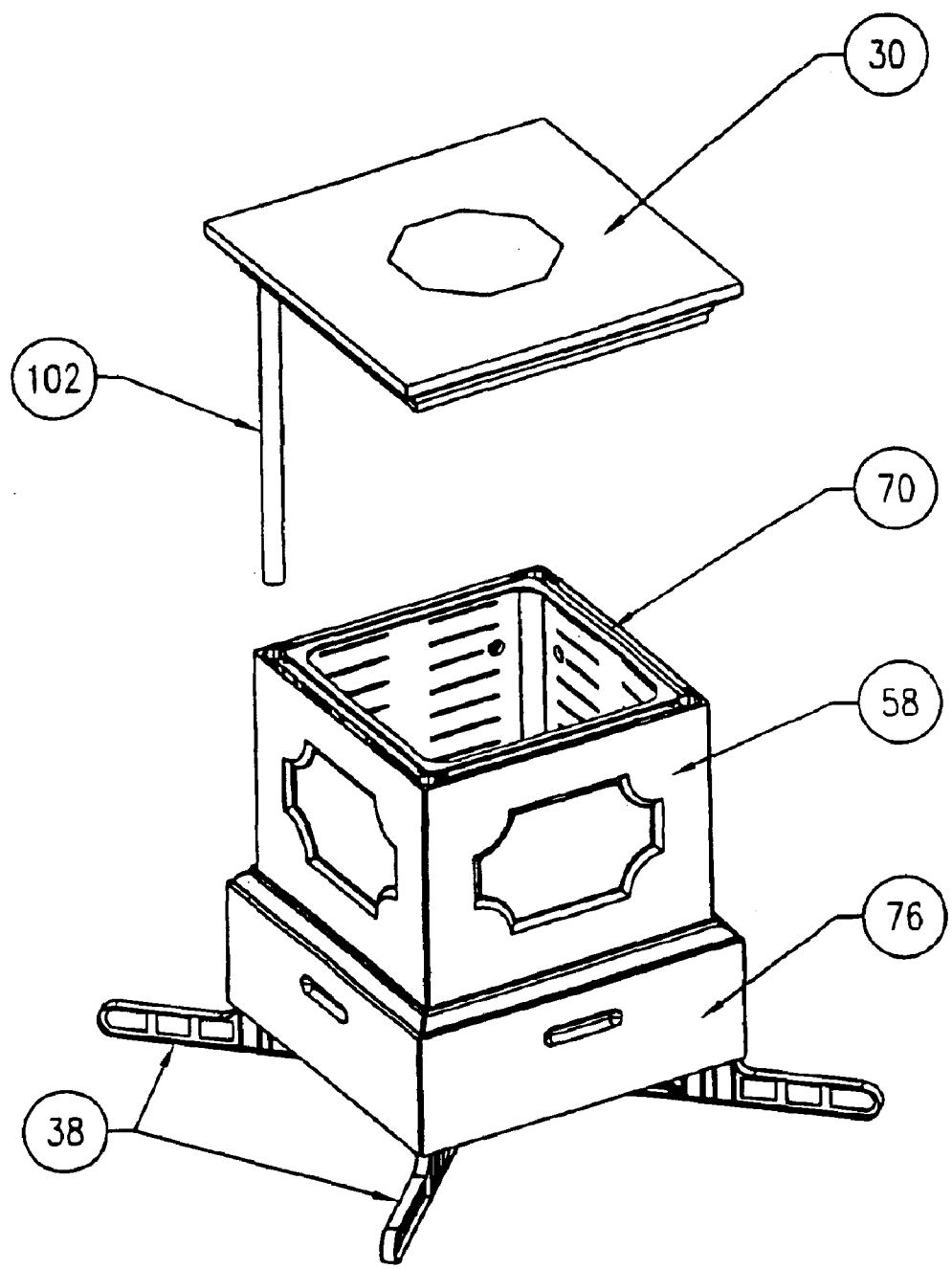
FIGS. 6A to 6C are a perspective views of further portions of the composting device of FIG. 1A, showing assembly of a removable top cover thereof.
Figure 6C:
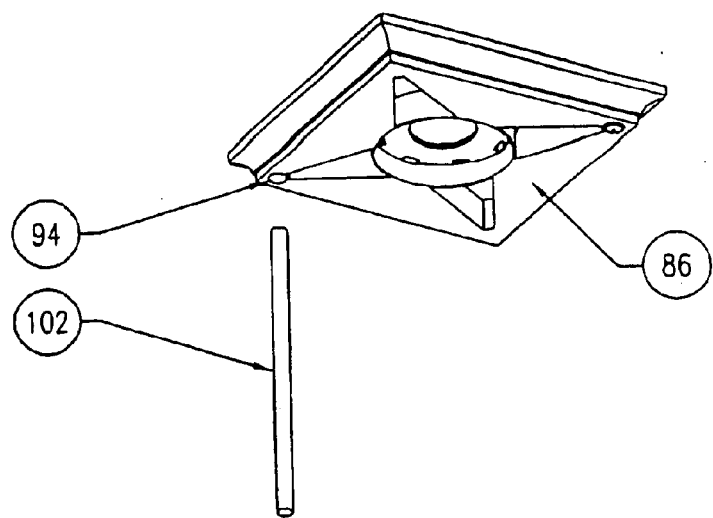
Figure 6B:
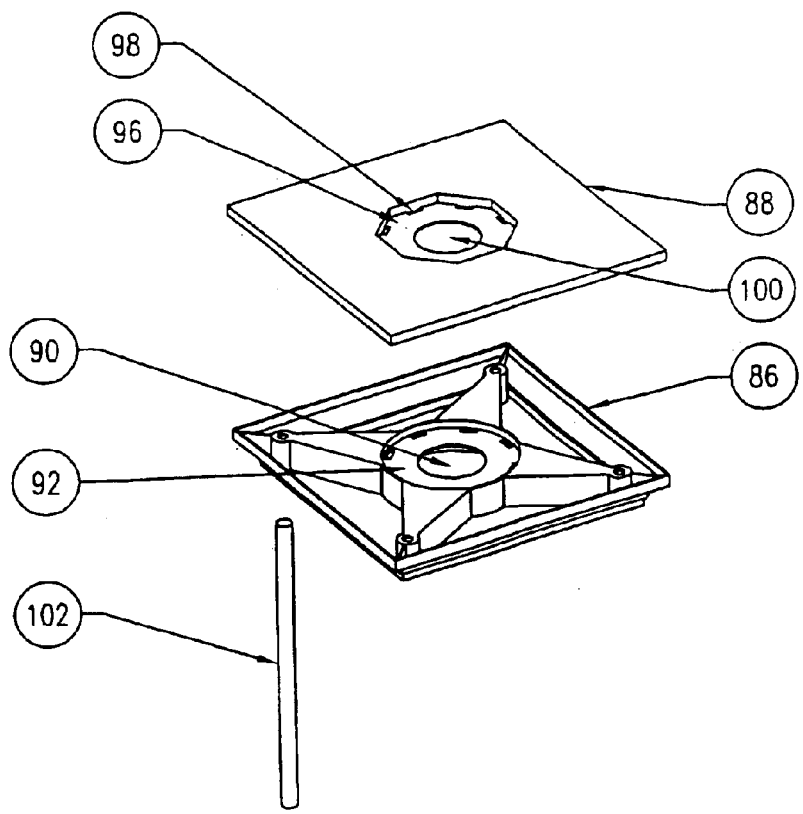

Referring now to FIGS. 6A, 6B and 6C, the removable top cover 30 is shown in the unassembled state. The removable top cover 30 includes a frame 86 and a top plate 88 that connects to and covers the top of the frame 86, when assembled. The frame 86 is generally square in shape, with a stepped profile, as shown. A center passage 90 is located in the center of the frame 86 and extends therethrough. A cylindrical recess 92 is concentric with and surrounds the center passage 90. Several spaced apart slots 92 are located around the periphery of the recess 92 and extend through the frame 86. Proximal each corner of the frame 86, a cylindrical bore 94 extends only partly through the frame 86, from an underside thereof.

The top plate 88 is generally square in shape and is sized and shaped to mate with and cover the frame 86. The top plate 88 includes a stepped polygonal section 96 that protrudes from one side thereof and is sized and shaped to fit within the cylindrical recess 92 in the frame 86. The top plate 88 also includes a center hole 100 that aligns with the center passage 90 when the top plate 88 and the frame 86 are assembled together. Each side of the stepped polygonal section 96 includes apertures 98 that are located to align with the spaced apart slots 92 of the frame 86. The removable top cover 30 is assembled by pushing the frame 86 and the top plate 88 together.

A cylindrical pivot bar 102 is sized to fit into the cylindrical bore 94 of the frame 86 and provide an interference fit therewith. Thus, one end of the pivot bar 102 is secured in the cylindrical bore 94 and extends from the underside of the removable top cover 30. The opposing end of the pivot bar 102 fits into the bore of one of the long corner posts 54 and is rotatable therein. When the pivot bar 100102 is inserted into the bore of one corner post 54, the removable top cover 30 is pivotable about the one corner post 54, by rotating the pivot bar 102 therein. Thus, the removable top cover 30 is pivotable between a closed position in which the top cover 30 covers the opening, referred to as the charge opening, defined by the sidewalls 28 of the composting device 20, and an open position in which the top cover 30 is pivoted away from the charge opening. Thus, when the top cover 30 is in the open position, the charge opening defined by the sidewalls 28, is exposed for adding compost matter to the composting device 20.

Figure 7:
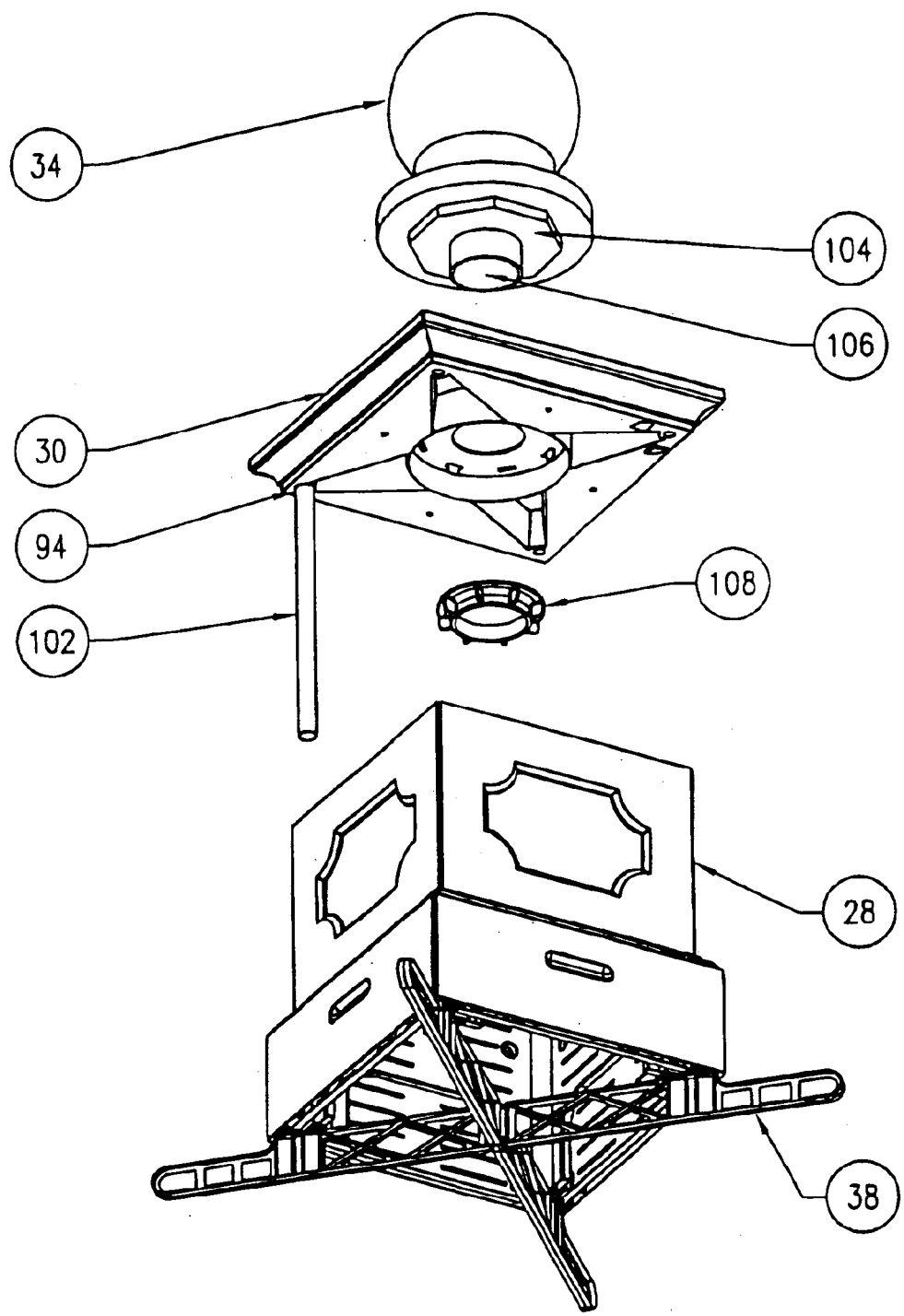
FIG. 7 is a partially exploded alternative perspective view of the composting device of FIG. 1A, showing assembly of an ornament thereof.

Referring to FIG. 7, the ornament 34 is added to the top cover 30. The ornament 34 includes a polygonal protrusion 104 extending from a bottom side thereof and a threaded shaft 106 extending from a center of the polygonal protrusion 104. The polygonal protrusion 104 is sized and shaped to fit into the stepped polygonal section 96 of the top plate 88 with the threaded shaft 106 extending through the center hole 100 of the top plate 88 and the center passage of the frame 86. To secure the ornament 34 on the removable top cover 30, an internally threaded ring 108 is threaded on to the threaded shaft 106 and tightened against a backside of the cylindrical recess 92 of the frame. Clearly the threaded shaft 106 and the threaded ring 108 act as a connecting portion that is complementary to the hole in the removable top cover 30 that is provided by the center passage 90 and the center hole 100. The top plate 88 and the frame 86 are sandwiched and secured together by tightening the threaded ring 108 on the threaded shaft 106 when the ornament is mounted on top of the removable top cover 30.

In use, the composting device 20 is used to compost organic matter. During assembly and prior to the addition of the removable top cover 30, a small X-shaped trench is made in the ground at a desirable location and the feet 38 of the composting device 20 are located in the trench. Earth is then back filled into the trench and compacted around the feet, leaving the remainder of the composting device 20 above ground. Preferably, an aluminum mesh screen is placed on the ground to act as a rodent screen. Assembly of the composting device 20 is then completed.

The organic matter to be composted is added to the composting device 20 by moving the removable top cover 30 to the open position to expose the charge opening. Organic matter is then added to the composting device 20. The feet 38 act to stabilize the composting device 20 when the removable top cover 30 is moved to the open position. After adding the organic matter, the removable top cover 30 is moved to the closed position.

Composted matter Is removed from the composting device 20 by removing one of the access panels 76 to expose the discharge opening. This is accomplished by sliding the access panel 76 out of the respective slots 56 of respective short corner posts 50. The composted matter is then removed. Clearly, the composted matter sits on exposed earth and the sidewalls 28 and top cover 30 contain and protect the pile of composted matter.

Figure 8B:
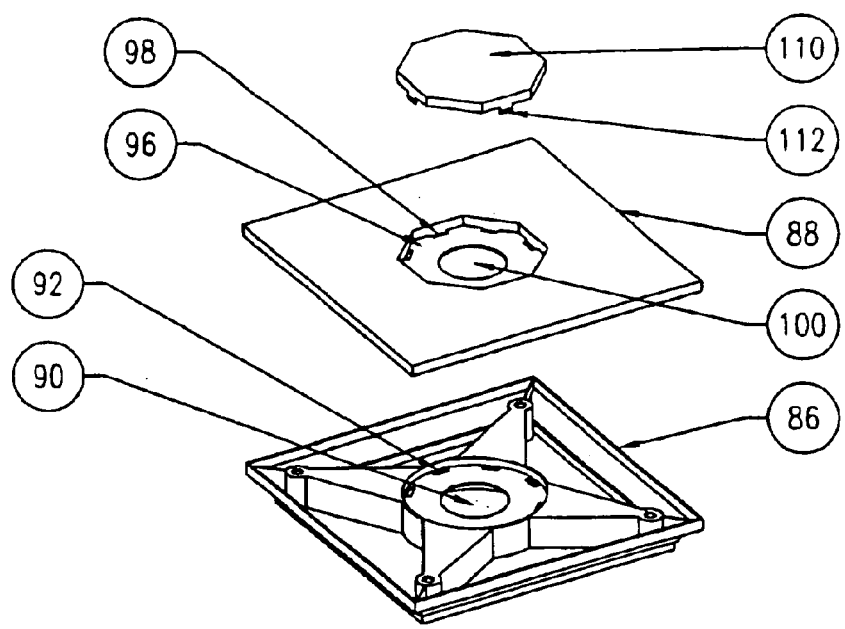
FIGS. 8A to 8C are perspective views of a composting device according to an alternative embodiment of the present invention.
Figure 8A:
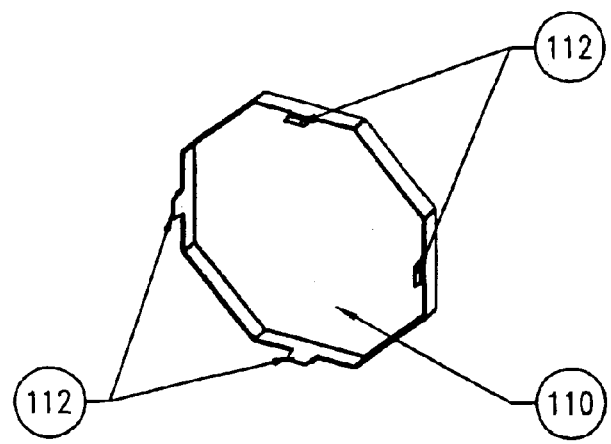
Figure 8C:
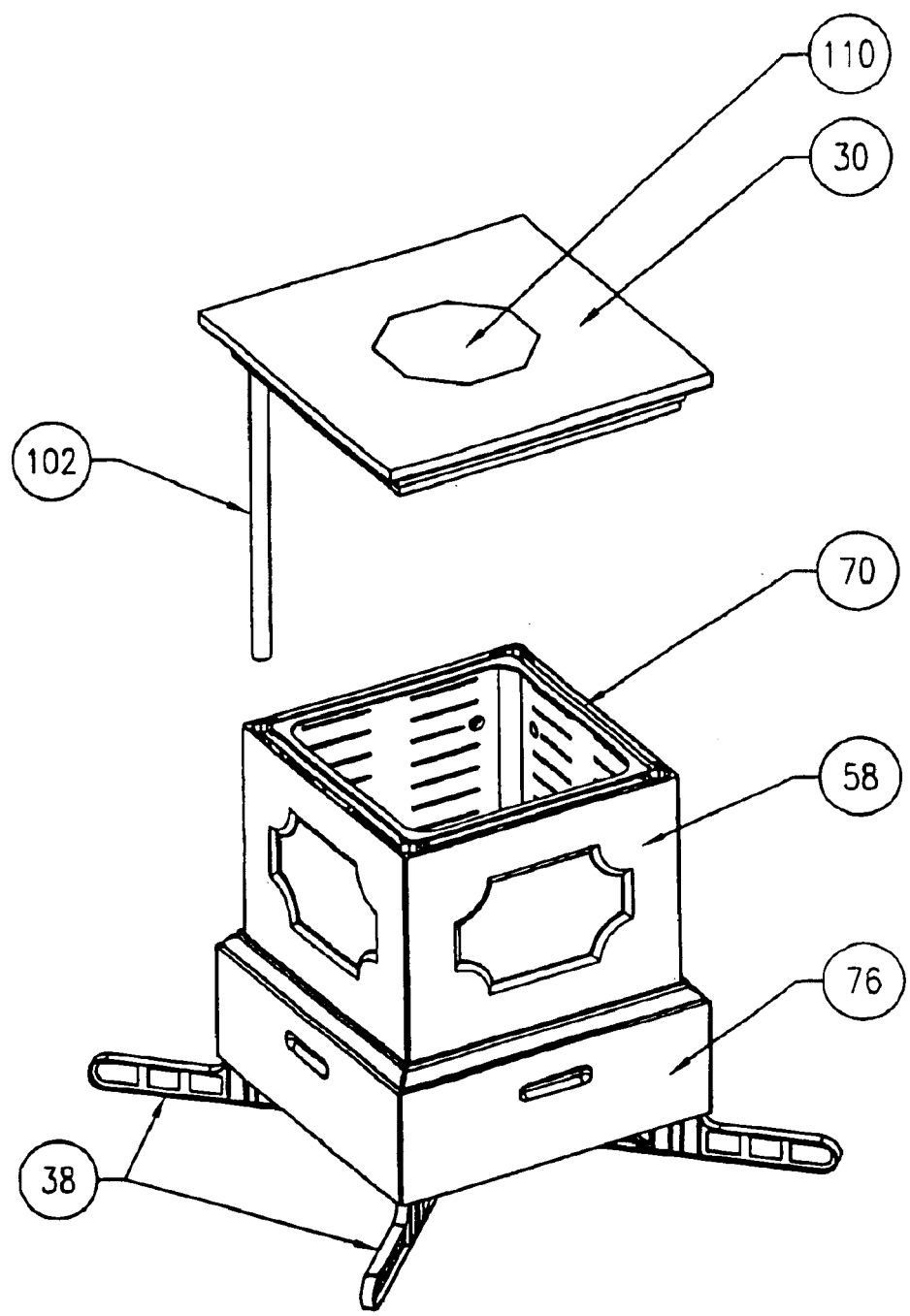

FIGS. 8A, 8B and 8C show an alternative embodiment of the present invention. In this embodiment, rather than mounting an ornament to the top cover 30, a top polygonal plug 110 is provided and is sized and shaped to fit in the stepped polygonal section 96 of the top plate 88, thereby covering the center hole 100 of the top plate 88. Snap-fit connecting hooks 112 extend from four of the sides of the polygonal plug 110 and are sized to fit through the apertures 98 of the top plate 100 and through the spaced apart slots 92 of the frame 86. The hooks 112 thereby engage with the frame 86 and hold the frame 86 and the top plate 88 together. Thus, the top of the composting device 20 is generally flat and an ornament is not included.

A specific embodiment of the present invention has been shown and described herein. However, modifications and variations to this embodiment is possible. For example, the size and shape of many of the elements described can vary while still performing a similar function. Although the ornament shown in the Figures is a cylindrical ornament, it will be understood that the ornament can be any suitable shape or figure and can be any suitable size and weight for support by the container 22. For example, an ornament such as a statue can be used. The composting device 20 can be assembled or can be in the form of a kit for assembly.

Still other modifications and variations may occur to those skilled in the art, all such modifications and variations are believed to be within the sphere and scope of the present invention.

What is claimed is:

1. A composting device for composting organic matter, comprising:
    a hollow container having a bottom end, a top end and at least one sidewall extending therebetween, the top end including a charge opening therein for adding said organic matter, the hollow container also having a discharge opening proximal the bottom end for removing compost matter, the hollow container being a parallelepiped and having four sidewalls extending between said bottom end and said top end;
    a removable top cover for cooperating with said top end of said hollow container to cover said charge opening, the top cover being removable to expose said charge opening, the top cover including a connector portion;
    an ornament including a corresponding connection portion, the corresponding connection portion cooperating with said connection portion of said top cover for mounting said ornament on said top cover; and
    a pivot bar coupled to said removable top cover and to said hollow container for pivoting said top cover about said container, between a closed position in which the top cover is disposed at said top end and covers said charge opening, and an open position in which the top cover is pivoted away from said top end, thereby exposing said charge opening, wherein said pivot bar is coupled to a corner post disposed between two of the four sidewalls of the container.

2. The composting device of claim 1, further comprising a plurality of feet fixed to said bottom end of said container, said feet for stabilizing said container when said top cover is pivoted between said closed position and said open position.

3. A composting device for composting organic matter, comprising:
    a hollow container having a bottom end, a top end and at least one sidewall extending therebetween, the top end including a charge opening therein for adding said organic matter, the hollow container also having a discharge opening proximal the bottom end for removing compost matter;
    a removable top cover for cooperating with said top end of said hollow container to cover said charge opening, the top cover being removable to expose said charge opening, the top cover including a connector portion; and
    an ornament including a corresponding connection portion, the corresponding connection portion cooperating with said connection portion of said top cover for mounting said ornament on said top cover, wherein each of said at least one sidewall includes and inner side panel having openings for ventilation and an outer side panel attached to said inner side panel, thereby providing a double-walled structure.

4. A composting device for composting organic matter, comprising:
    a hollow container having a bottom end, a top end and at least one sidewall extending therebetween, the top end including a charge opening therein for adding said organic matter, the hollow container also having a discharge opening proximal the bottom end for removing compost matter, the container having four sidewalls, each sidewall being tiered, such that each sidewall includes a side panel portion adjacent said top end, and a step-wise tiered access panel portion extending from said side panel portion to said bottom end, said access panel portion being openable to expose said discharge opening;
    a removable top cover for cooperating with said top end of said hollow container to cover said charge opening, the top cover being removable to expose said charge opening, the top cover including a connector portion; and
    an ornament including a corresponding connection portion, the corresponding connection portion cooperating with said connection portion of said top cover for mounting said ornament on said top cover, wherein each side panel portion includes an inner side panel and an outer side panel attached to said inner side panel, said inner side panel having openings for ventilation.

5. The composting device of claim 4, wherein each access panel portion includes and inner access panel and an outer access panel attached to said inner access panel, said inner side panel having openings for ventilation.

6. A composting device for composting organic matter, comprising:
    a hollow container having a bottom end, a top end and at least one sidewall extending therebetween, each of said at least one sidewall including an inner side panel having openings for ventilation and an outer side panel attached to said inner side panel to provide a double-walled structure, the top end including a charge opening therein for adding said organic matter, the container further including a discharge opening proximal the bottom end, for removing compost matter; and a removable top cover for cooperating with said top end of said hollow container to cover said charge opening, the top cover being removable to expose said charge opening.

7. The composting device of claim 6, wherein said hollow container is cylindrically shaped and has a single sidewall extending between said bottom end and said top end.

8. The composting device of claim 6, wherein said hollow container is a parallelepiped and has four sidewalls extending between said bottom end and said top end.

9. The composting device of claim 6, wherein said removable top cover is pivotally attached to said hollow container to pivot between a closed position in which the top cover is disposed at said top end and covers said charge opening, and an open position in which the top cover is pivoted away from said top end, thereby exposing said charge opening.

10. The composting device of claim 8, further comprising a pivot bar coupled to said removable top cover and to said hollow container for pivoting said top cover about said container, between a closed position in which the top cover is disposed at said top end and covers said charge opening, and an open position in which the top cover is pivoted away from said top end, thereby exposing said charge opening.

11. The composting device of claim 10, wherein said pivot bar is coupled to a corner post disposed between two of the four sidewalls of the container.

12. The composting device of claim 9, further comprising a plurality of feet fixed to said bottom end of said container, said feet for stabilizing said container when said top cover is pivoted between said closed position and said open position.

13. The composting device of claim 6, wherein said container has four sidewalls, each sidewall being tiered, such that each sidewall includes a side panel portion adjacent said top end, and a step-wise tiered access panel portion extending from said side panel portion to said bottom end, the access panel portion being openable to expose said discharge opening.

14. A composting device kit for assembly into a composter for composting organic matter, the kit comprising:

a plurality of sidewalls, each sidewall including an inner side panel having openings for ventilation, and an outer side panel for attachment to said inner side panel, said sidewalls including attachment means for assembling said sidewalls into a hollow container having a bottom end and a top end with said sidewalls extending therebetween, such that, when assembled, said top end includes a charge opening for said organic matter, at least a portion of one of said sidewalls being moveable to expose a discharge opening proximal the bottom end for removing compost matter; and a removable top cover for cooperating with said top end of said hollow container to cover said charge opening when assembled, the top cover being removable to expose said charge opening.

* * * * *